(12) United States Patent
Knittel

(10) Patent No.: US 11,270,209 B2
(45) Date of Patent: Mar. 8, 2022

(54) METHOD FOR TRAINING AN ARTIFICIAL NEURAL NETWORK BY SCALING ACTIVATION VALUES

(71) Applicant: CANON KABUSHIKI KAISHA, Tokyo (JP)

(72) Inventor: Anthony Knittel, Maroubra (AU)

(73) Assignee: Canon Kabushiki Kaisha, Tokyo (JP)

( * ) Notice: Subject to any disclaimer, the term of this patent is extended or adjusted under 35 U.S.C. 154(b) by 1118 days.

(21) Appl. No.: 15/844,112

(22) Filed: Dec. 15, 2017

(65) Prior Publication Data
US 2018/0174051 A1 Jun. 21, 2018

(30) Foreign Application Priority Data
Dec. 19, 2016 (AU) ................................ 2016277542

(51) Int. Cl.
*G06N 3/08* (2006.01)
*G06N 3/04* (2006.01)

(52) U.S. Cl.
CPC ............. *G06N 3/084* (2013.01); *G06N 3/04* (2013.01); *G06N 3/0481* (2013.01); *G06N 3/0454* (2013.01)

(58) Field of Classification Search
CPC ........ G06N 3/084; G06N 3/0481; G06N 3/04; G06N 3/0454
See application file for complete search history.

(56) References Cited

U.S. PATENT DOCUMENTS

| 7,921,106 B2* | 4/2011 | Chen ..................... G06F 16/951 707/723 |
| 8,743,234 B1* | 6/2014 | Walker .................... G06T 5/009 348/222.1 |
| 2003/0050719 A1* | 3/2003 | Bao-Liang .......... G06K 9/6281 700/91 |

(Continued)

OTHER PUBLICATIONS

Glorot et al. "Deep Sparse Rectifier Neural Networks" International Conference on Artificial Intelligence and Statistics (AISTATS) 2011, Fort Lauderdale, FL, USA. vol. 15 of JMLR: W&CP 15 (Year: 2011).*

(Continued)

*Primary Examiner* — Michael J Huntley
*Assistant Examiner* — Jaeyong J Park
(74) *Attorney, Agent, or Firm* — Canon U.S.A., Inc. IP Division

(57) ABSTRACT

A system and method of training an artificial neural network. The method comprises determining an activation value for each node in a set of nodes of the artificial neural network, the activation values being determined by applying training data to the artificial neural network, and scaling the determined activation values for each of a plurality of the nodes in a portion of the artificial neural network. Each scaled activation value is determined using a scaling factor associated with a corresponding one of the plurality of nodes. Each scaling factor is determined based on a rank of the corresponding node. The method further comprises updating weights associated with each of the plurality of nodes in the portion of the artificial neural network using the determined scaled activation values to train the neural network.

17 Claims, 11 Drawing Sheets

(56) References Cited

U.S. PATENT DOCUMENTS

| | | | | |
|---|---|---|---|---|
| 2004/0260662 | A1* | 12/2004 | Staelin | G06N 3/08 706/16 |
| 2009/0138420 | A1* | 5/2009 | Swift | H04L 41/145 706/21 |
| 2014/0172937 | A1* | 6/2014 | Linderman | G06N 3/0445 708/607 |
| 2014/0309122 | A1* | 10/2014 | Min | G16B 40/00 506/8 |
| 2015/0347530 | A1* | 12/2015 | Wendker | G06F 16/9535 707/723 |
| 2017/0032247 | A1* | 2/2017 | Tadesse | G06N 20/00 |
| 2017/0061328 | A1* | 3/2017 | Majumdar | G06K 9/627 |
| 2018/0279939 | A1* | 10/2018 | Madsen | G06K 9/627 |

OTHER PUBLICATIONS

Bogdan et al. "Statistical estimation and testing via the sorted L1 norm" (Year: 2013).*

Zeng et al. "The atomic norm formulation of OSCAR regularization with application to the Frank-Wolfe algorithm" IEEE, 2014 22nd European Signal Processing Conference (EUSIPCO) (Year: 2014).*

Shi et al. "Rank-based pooling for deep convolutional neural networks", Elsevier, vol. 83, Nov. 2016, pp. 21-31 (Year: 2016).*

Scardapane et al. "Group Sparse Regularization for Deep Neural Networks" (Year: 2016).*

Zeiler, Matthew D, Ranzato, Marc'Aurelio, Monga, Rajat, Mao, Min, Yang, Kun, Le, Quoc Viet, Nguyen, Patrick, Senior, Alan, Vanhoucke, Vincent, Dean, Jeffrey, others; On rectified linear units for speech processing. In Acoustics, Speech and Signal Processing (ICASSP), 2013 IEEE International Conference on, 2013; p. 3517-3521.

Memisevic, Roland; Konda, Kishore; Krueger, David. Zero-bias auto encoders and the benefits of co-adapting features stat 2014, 1050, pp. 10.

Andrew Ng, Sparse Encoder; Stanford University 2011 pp. 1-19.

* cited by examiner

METHOD FOR TRAINING AN ARTIFICIAL NEURAL NETWORK BY SCALING ACTIVATION VALUES

REFERENCE TO RELATED APPLICATIONS

This application claims the benefit under 35 U.S.C. § 119 of the filing date of Australian Patent Application No. 2016277542, filed 19 Dec. 2016, hereby incorporated by reference in its entirety as if fully set forth herein.

TECHNICAL FIELD

The present invention relates to a method, system and apparatus for training an artificial neural network. The present invention further relates to a computer readable medium storing instructions executable to implement a method for training an artificial neural network. Training the artificial neural network configures the parameters of the artificial neural network.

BACKGROUND

Analysis of data often involves classifying the data into categories, for example recognising a label that represents an object present in the image. A common method is to determine the relationships between data and labels using an artificial neural network classifier. An artificial neural network is composed of a set of nodes, a set of edges (also referred to as connections), and a set of edge weights. Each of the edges is weighted and connects two nodes of the network. The weighted edges are also referred to as weighted connections. The artificial neural network is trained using a set of training input instances and training targets. The artificial neural network is trained to apply a classification label to new data based on the relationship between training data instances and labels.

A common problem is that artificial neural networks learn classification relationships that produce incorrect labels when used to classify new data. For example an artificial neural network can lean to identify pictures of dogs and correctly apply the label "dog" to the training images. However, when classifying a picture of a dog that is not in the training set, the network incorrectly selects the label "cat" instead of the correct label. The term "overfitting" refers to the situation where an artificial neural network, learns to classify examples the artificial neural network has been trained on with higher accuracy than examples that have not been used in training.

A need exists to address or at least ameliorate one or more of the problems associated with training an artificial neural network.

SUMMARY

One aspect of the present disclosure provides a method of training an artificial neural network, the method comprising: determining an activation value for each node in a set of nodes of the artificial neural network, the activation values being determined by applying training data to the artificial neural network; scaling the determined activation values for each of a plurality of the nodes in a portion of the artificial neural network, each scaled activation value determined using a scaling factor associated with a corresponding one of the plurality of nodes, each scaling factor being determined based on a rank of the corresponding node; and updating weights associated with each of the plurality of nodes in the portion of the artificial neural network using the determined scaled activation values to train the neural network.

In some aspects, the rank of each of the plurality of the nodes is determined according to the activation value of the node.

In some aspects, the plurality of the nodes are ranked from a highest activation value to a lowest activation value, the node having the highest activation value being assigned lowest rank, and the node having the lowest activation value being assigned highest rank.

In some aspects, the plurality of the nodes are ranked from a highest activation value to a lowest activation value, the node having the highest activation value being assigned lowest rank, and the node having the lowest activation value being assigned highest rank, wherein the scaling factor for the node with lowest rank is a lowest scaling factor, and the scaling factor for the node with highest rank is a highest scaling factor.

In some aspects, the plurality of the nodes are ranked from a highest activation value to a lowest activation value, the node having the highest activation value being assigned lowest rank, and the node having the lowest activation value being assigned highest rank, wherein nodes with activation values between the highest activation value and the lowest activation value have scaling factors between the highest scaling factor and the lowest scaling factor.

In some aspects, the scaling factor varies monotonically according to the rank of the associated node.

In some aspects, the scaling factor associated with one of the plurality of nodes has a different value to the scaling factors associated with other nodes in the plurality of nodes.

In some aspects, the scaling factor associated with one of the plurality of the nodes is repeated in at least one scaling factor associated with another node in the plurality of the nodes.

In some aspects, the training data is additional training data and training the artificial neural network relates to incremental learning by the artificial neural network.

In some aspects, the method further comprises determining a sparsity penalty value based on relative ranking of the activation values of the plurality of the nodes.

In some aspects, the method further comprises determining a sparsity penalty value using the scaled activation values, and updating the weights relates to the sparsity penalty value.

In some aspects, the method further comprises determining a sparsity penalty value using the scaled activation values, determining a derivative of the sparsity penalty value and updating the weights based on the determined derivative.

In some aspects, the method further comprises sorting the activation values of the plurality of the nodes in the portion of the artificial neural network in order of decreasing value and determining the rank of each node in an incrementing sequence.

In some aspects, the method farther comprises normalising the determined activation values of the plurality of the nodes using a mean of the determined activation values of the nodes, and determining the rank of the nodes using the normalised activation values.

Another aspect of the present disclosure provides a computer readable medium having a computer program stored thereon for training an artificial neural network, said program comprising: code for determining an activation value for each node in a set of nodes of the artificial neural network, the activation values being determined by applying training data to the artificial neural network; code for scaling the determined activation values for each of a plurality of the nodes in a portion of the artificial neural network, each scaled activation value determined using a scaling factor associated with a corresponding one of the plurality of nodes, each scaling factor being determined based on a rank of the corresponding node; and code for updating weights associated with each of the plurality of nodes in the portion of the artificial neural network using the determined scaled activation values to train the neural network.

Another aspect of the present disclosure provides apparatus for training an artificial neural network, the apparatus comprising: means for determining an activation value for each node in a set of nodes of the artificial neural network, the activation values being determined by applying training data to the artificial neural network; means for scaling the determined activation values for each of a plurality of the nodes in a portion of the artificial neural network, each scaled activation value determined using a scaling factor associated with a corresponding one of the plurality of nodes, each scaling factor being determined based on a rank of the corresponding node; and means for updating weights associated with each of the plurality of nodes in the portion of the artificial neural network using the determined scaled activation values to train the neural network.

Another aspect of the present disclosure provides a system for training an artificial neural network, the system comprising: a memory for storing data and a computer program; a processor coupled to the memory for executing said computer program, said computer program comprising instructions for: determining an activation value for each node in a set of nodes of the artificial neural network, the activation values being determined by applying training data to the artificial neural network; scaling the determined activation values for each of a plurality of the nodes in a portion of the artificial neural network, each scaled activation value determined using a scaling factor associated with a corresponding one of the plurality of nodes, each scaling factor being determined based on a rank of the corresponding node; and updating weights associated with each of the plurality of nodes in the portion of the artificial neural network using the determined scaled activation values to train the neural network.

Other aspects are also described.

BRIEF DESCRIPTION OF THE DRAWINGS

One or more example embodiments of the invention will now be described with reference to the following drawings, in which.

DETAILED DESCRIPTION INCLUDING BEST MODE

Figure 1:
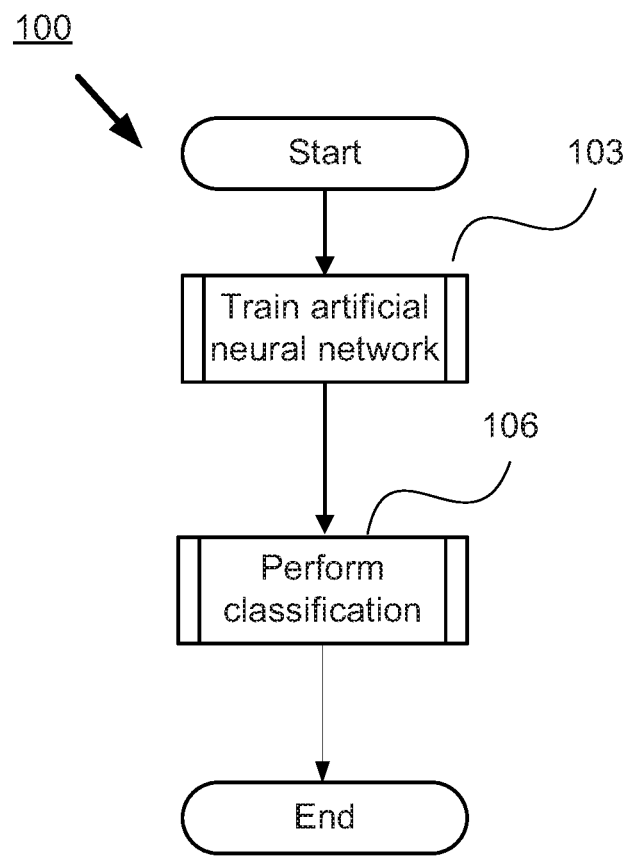
FIG. 1 is a schematic flow diagram of a method for performing classification using an artificial neural network.

A method and system for classifying data is described below.

Classification of data involves applying a label or output for an instance of data, for example by applying the label for an action present in a video sequence. A set of instances of training data and labels are used to train a classification system such as an artificial neural network. The artificial neural network is trained to be able to perform classification of instances not present in the training data, based on a relationship between data and labels for the instances of the training set.

An artificial neural network forms a classification system consisting of a network of nodes and edges. Edges are also known as connections. Each edge is weighted, having an associated real-value number or weight representing a strength of a connection between the nodes. The artificial neural network is defined using a number of layers, where each layer consists of a set of edge weights and a set of nodes. When the artificial neural network is trained for classification, each node has a real-valued number representing an activation value of the node. The activation value is a response produced by the node based on a value of inputs to the node and the connection strengths (edge weights). In addition to classification, artificial neural networks are used for other purposes such as reconstructing data provided to the artificial neural network as input.

To perform classification of an instance of data, the instance is provided as input data values to the artificial neural network. The input data values are used as activation values for each of the input nodes. Activation of nodes in each layer of the artificial neural network is performed by propagation of values from the input nodes to nodes in higher value layers of the artificial neural network, according to the strength of the connections between the nodes, and other functions defined by the artificial neural network, such as the activation function. Possible activation functions include, but are not limited to: the sigmoid function, the hyperbolic tangent function, and the rectified linear function. For each instance of the training data the activation value of output nodes of the artificial neural network is determined, and compared with a corresponding training target. The relationship between the activation value of the output nodes and the corresponding training target is the error value. The error value is used to modify the connections of the artificial neural network. In this manner, the artificial neural network is trained to recognise the relationship between the input data values and the target labels. The error value may, for example, relate to a difference, a sum or a negative logarithm likelihood function between the activation value of the output nodes and the corresponding training target.

In arrangements described below, target, training target, and target label correspond to the same concept. In one implementation, a target label is represented by a value that has meaning for humans, e.g. "dog", while a target is represented by a number, e.g. 23, which is an internal representation for "dog".

A problem with artificial neural networks is that such networks learn to classify instances of the training set more accurately than examples not in the training set. This problem is known as overfitting.

Another problem with artificial neural networks is that training artificial neural networks requires processing many input data instances and corresponding target labels. As more training data instances are processed, accuracy of the network may gradually improve, as the network approaches the final accuracy. However, the number of training data instances may be prohibitively large, requiring a large amount of processing time in order to achieve a required accuracy.

One method of addressing one or more of the problems described above is to inhibit the operation of a proportion of the connections in the artificial neural network during training. For each training instance, a set of the edge weights in the artificial neural network are disabled, such that the disabled edge weights do not influence the artificial neural network activation. The set of edge weights to disable is determined independently for each training instance, and may be selected randomly. When the artificial neural network is used to perform classification, all of the artificial neural network edge weights are used and none are disabled. When edge weight-disabling is used in training an artificial neural network, the artificial neural network often shows less overfitting, and performs better at classifying images that were not used in training than when edge weight disabling is not used. On many classification tasks, particularly when the number of available training data instances is small, the use of random edge weight disabling is not sufficient to allow effective learning by the artificial neural network.

Another existing method of addressing one or more of the problems described above is to adjust the edge weights of each node in order to limit the number of training data instances for which the node has a large activation value in response. Thus, ideally, each node responds sparsely to instances of the training data. The adjustment of the edge weights for a node is performed by determining a sparsity penalty, based on the activation values of the node in response to the training data instances. The sparsity penalty value may also be referred to as a regularisation cost, a cost function, a loss function, or an objective function If the node responds sparsely to the training data instances, the sparsity penalty is low. If the node does not respond sparsely to the training data instances, the sparsity penalty is high. The sparsity penalty is used to modify the connections of the artificial neural network, in addition to modifications resulting from the error value. However, on many classification tasks, existing methods of modifying the connections of the artificial neural network incorporating the sparsity penalty are not sufficient to allow effective learning by the artificial neural network.

Use of the sparsity penalty can be used for unsupervised learning. Unsupervised learning relates to training a classifier such as an artificial neural network without labelled data. Unsupervised learning allows patterns and/or structures in the data to be found without relying on extensive, detailed labelling. Existing methods of modifying the connections of the artificial neural network incorporating the sparsity penalty are not sufficient to allow effective unsupervised learning by the artificial neural network.

Figure 3:
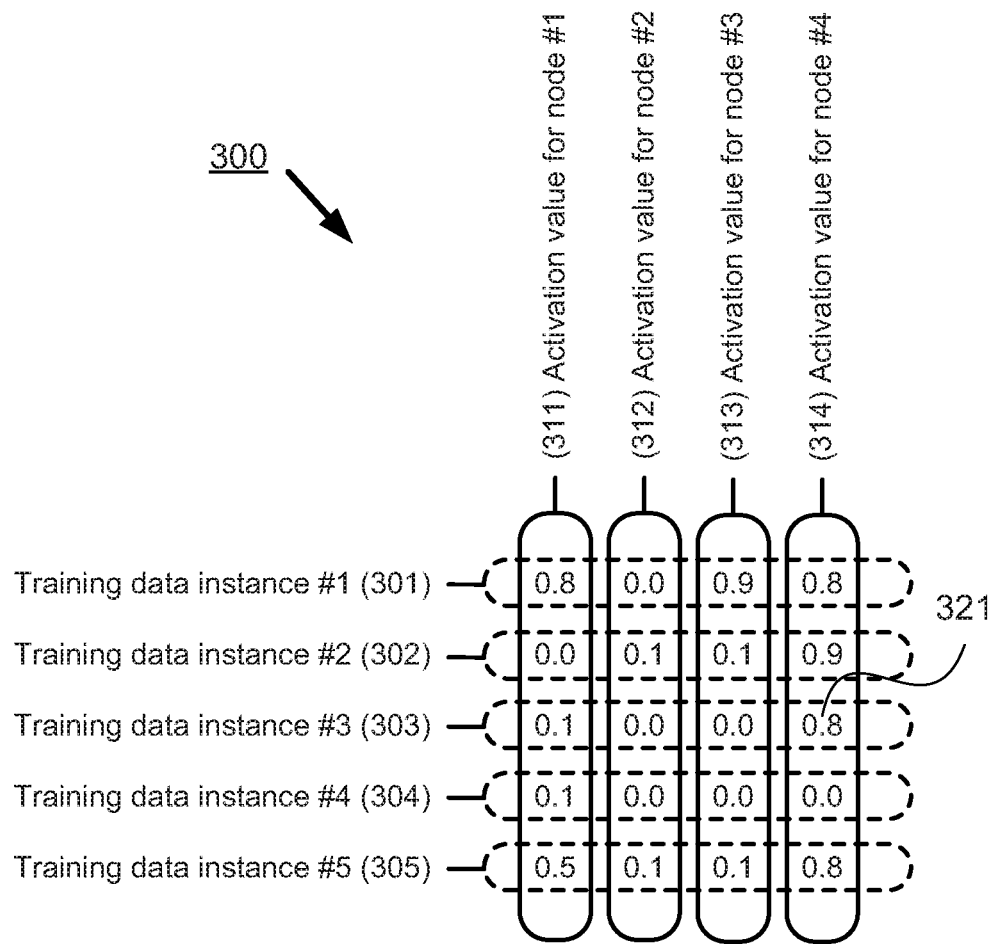
FIG. 3 is a tabular representation of an example of activation values of a set of nodes in an artificial neural network, in response to training data instances.

FIG. 3 depicts an example arrangement 300 of activation values of an artificial neural network, in response to a set of training data instances. In FIG. 3, each row 301, 302, 303, 304, 305 corresponds to a training data instance, and each column 311, 312, 313, 314 corresponds to a node in the artificial neural network. A value at an intersection of a row and a column represents an activation value of the corresponding node, in response to the corresponding training data instance as input to the artificial neural network. For example, an intersection 321 represents the activation value of a node #4 corresponding to column 314, in response to receiving a training data instance #3 (corresponding to row 303) as input.

The adjustment of edge weights of each node in order to limit the number of training data instances for which the node has a large activation value in response is now described by reference to the example of FIG. 3. The response of the node #4 in column 314 is shown in response to each of training data instance #1 in row 301, training data instance #2 in row 302, training data instance #3 in row 303, training data instance #4 in row 304 and training data instance #5 in row 305. Ideally, node #4 (column 314) would respond sparsely to the training data instances #1 (row 301), #2 (row 302), #3 (row 303), #4 (row 304) and #5 (row 305). The response values are [0.8, 0.9, 0.8, 0.0, 0.8]. The response values show that node #4 (column 314) responds with a large activation value to training data instances #1 (row 301), #2 (row 302), #3 (row 303), and #5 (row 305), and responds with a small activation value training data instance #4 (row 304). In the example 300, the node #4 responds strongly to four training data instances (rows 301, 302, 303 and 305), and weakly to one training data instance (row 304). In the example arrangement 300, the node #1 has responses that are not sparse. In order to limit the number of training data instances for which the node #4 has a relatively large activation value, the sparsity penalty (regularisation cost) is required to be relatively high. The sparsity penalty is used to modify the edge weights of the artificial neural network, in addition to the modifications resulting from the error value to limit the number of training data instances having a relatively high activation value.

In the example arrangement 300, the sparsity penalty (cost function) has an effect of reducing the responses of the node #4 (column 314) to all training data instances, in proportion to the activation values of the training data instances. Application of the sparsity penalty using known methods typically causes a reduction in the responses from training data instance #1 (row 301), training data instance #2 (row 302), training data instance #3 (row 303), and training data instance #5 (row 305), almost equally. The reduction in the activation responses using known methods is often problematic, because training data instance #2 (row 302) produces a stronger response in node #4 (column 314) than training data instances #1 (row 301), #3 (row 303) and #5 (row 305). In order for node #4 (column 314) to respond sparsely to training data instances #1 (row 301), #2 (row 302), #3 (row 303), #4 (row 304), and #5 (row 305), reducing the responses from training data instances #1 (row 301), #3 (row 303), and #5 (row 305) without causing a reduction in the response from training data instance #2 (row 302) is needed. Reducing the responses from training data instances for rows 301, 303, and 305 without causing a reduction in the response from row 302 provides an example of adjusting or updating edge weights of each node in order to limit the number of training data instances for which the node has a large activation value in response.

Another existing method of addressing one or more of the problems described is to adjust the edge weights of a set of nodes in order to limit the number of nodes in the set which have a large activation value for a given training data instance or a given set of training data instances. The set of nodes may include all nodes in the artificial neural network, or alternatively all nodes in a given layer of the artificial neural network. Thus, ideally, the set of nodes responds sparsely to a given training data instance or a given set of training data instances. The adjustment of the edge weights for a set of nodes is performed by determining a sparsity penalty, based on the activation values of the nodes in the set in response to the training data instance or set of training data instances. If the set of nodes responds sparsely to the training data instance, the sparsity penalty is low. If the set of nodes does not respond sparsely to the training data instance, the sparsity penalty is high. The sparsity penalty (objective function) is used to modify the connections of the artificial neural network, in addition to the modifications resulting from the error value. However, on many classification tasks, existing methods of modifying the connections of the artificial neural network incorporating the sparsity penalty are not sufficient to allow effective learning by the artificial network.

The adjustment of edge weights of each node, in a set of nodes, in order to limit the number of nodes in the set which have a large activation value for a given training data instance is now described by reference to the example arrangement 300 of FIG. 3. The example is described in relation to the nodes #1, #2, #3 and #4, corresponding to columns 311, 312, 313, 314 respectively, as a set of nodes. The example relates to the response of the set of nodes #1 (column 311), #2 (column 312), #3 (column 313), #4 (column 314) to receiving training data instance corresponding to row 301, as input to an artificial neural network. Ideally, training data instance #1 (row 301) would produce a sparse response in the activation values of the set of nodes #1 (column 311), #2 (column 312), #3 (column 313) and #4 (column 314). The activation values are [0.8, 0.0, 0.9, 0.8].

As shown in the example arrangement 300, the training data instance #1 (row 301) has responses with a relatively large activation values in nodes #1 (column 311), #3 (column 313) and #4 (column 314), and has a response with a relatively small activation value in node #2 (column 312). In the example 300, the training data instance of the row 301 has three nodes that respond relatively strongly, and one node that responds relatively weakly. In the example 300, the responses of the set of nodes of columns 311 to 314 are not sparse. In order to limit the number of nodes in the set of nodes for which the training data instance of row 301 has a relatively large activation value, the sparsity penalty (regularisation cost) will be high. The sparsity penalty is used to modify the edge weights of the artificial neural network, in addition to the modifications resulting from the error value. Application of the sparsity penalty to each node in the set of nodes in proportion to the activation value of the node causes a reduction in the responses of node #1 (column 311), node #3 (column 313), and node #4 (column 314), almost equally. The reduction in responses is not ideal, because training data instance #1 (301) produced a stronger response in node #3 (column 313) than in node #1 (column 311) and node #4 (column 314). In order for training data instance #1 (row 301) to cause a sparse response in the set of nodes #1 (column 311), #2 (column 312), #3 (column 313), and #4 (column 314), and there is a need to reduce the responses of node #1 (column 311) and node #4 (column 314) without causing a significant reduction of the response of node #3 (313). Reducing the responses of the nodes of columns 311 and 314 provides another example of adjustment of edge weights of each node, in a set of nodes, in order to limit the number of nodes in the set which have a large activation value for a given training data instance.

A need exists for a method for addressing one or more of the problems so as to allow sparsity penalties to be determined and applied to the connections of the artificial neural network in order to allow effective learning by the artificial neural network. The presently described arrangements increase the accuracy of classification by the artificial neural network by addressing one or more of the problems of overfitting using a small number of available training data instances. The arrangements described relate to a method of training an artificial neural network implemented on a computer system, or on a device similar to a computer system, such as a personal electronics device.

Figure 8A:
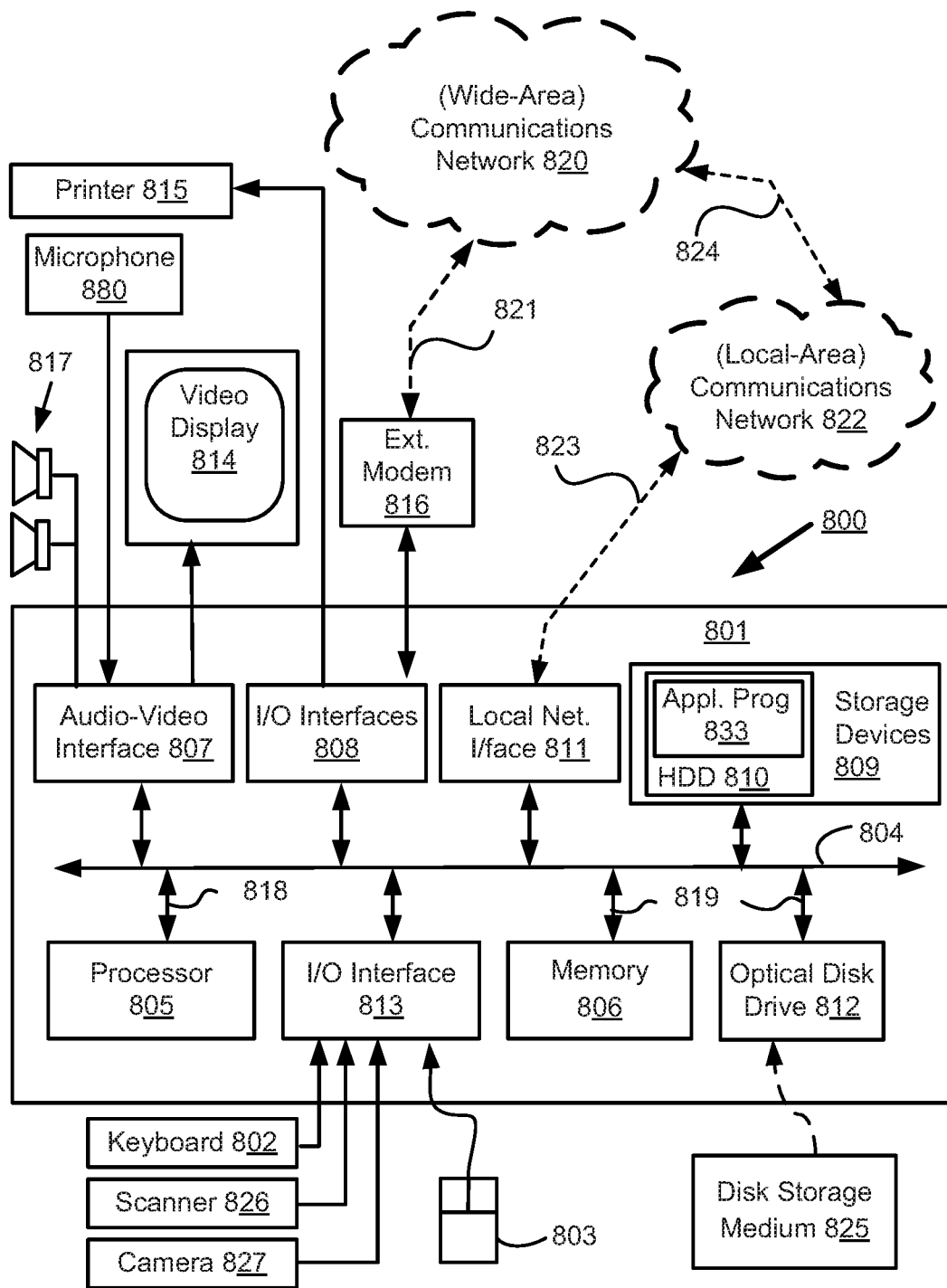
FIGS. 8A and 8B form a schematic block diagram of a general purpose computer system upon which arrangements described can be practiced.
Figure 8B:
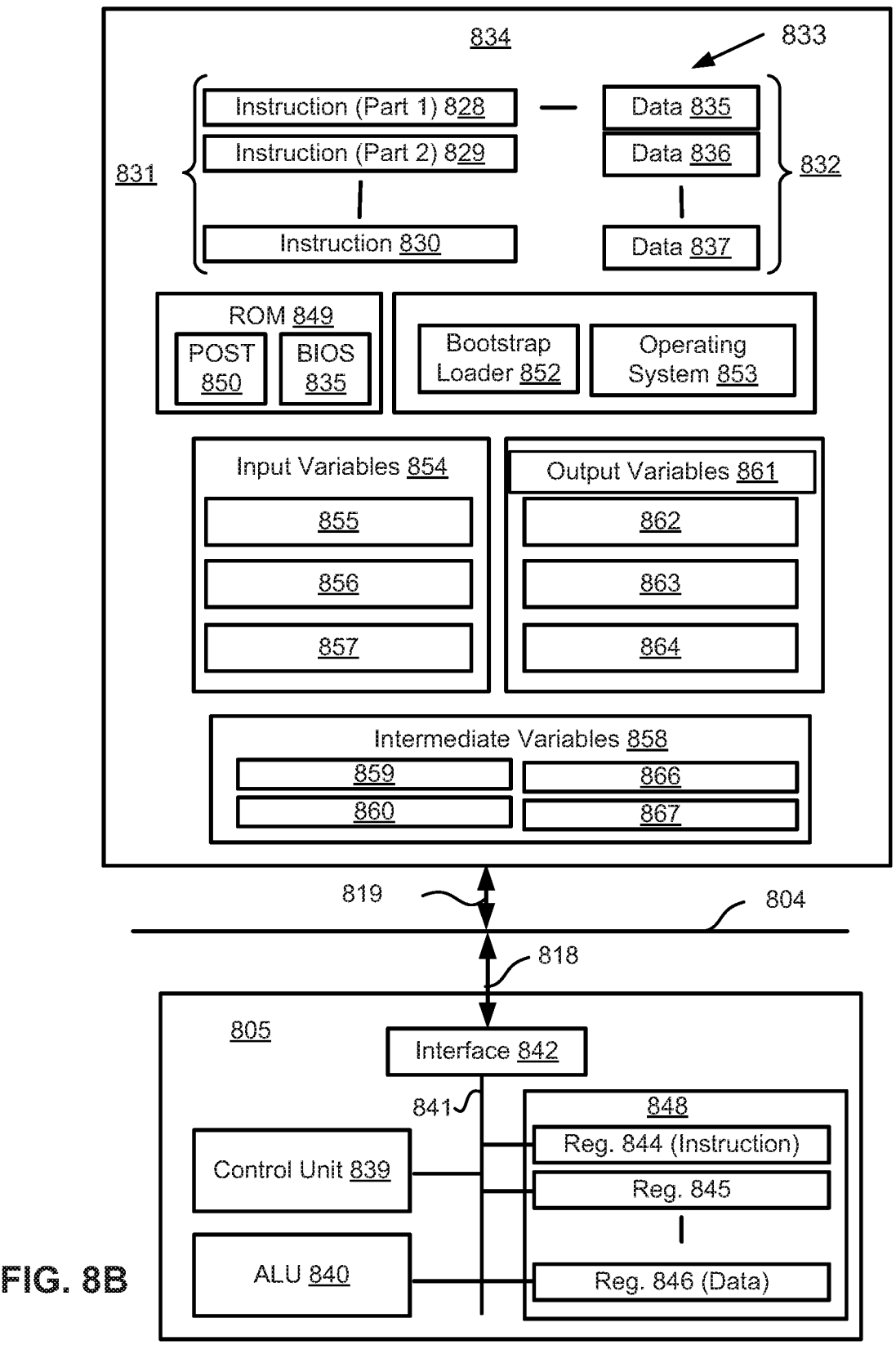

FIGS. 8A and 8B depict a general-purpose computer system 800, upon which the various arrangements described can be practiced.

As seen in FIG. 8A, the computer system 800 includes: a computer module 801; input devices such as a keyboard 802, a mouse pointer device 803, a scanner 826, a camera 827, and a microphone 880; and output devices including a printer 815, a display device 814 and loudspeakers 817. An external Modulator-Demodulator (Modem) transceiver device 816 may be used by the computer module 801 for communicating to and from a communications network 820 via a connection 821. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

The computer module 801 typically includes at least one processor unit 805, and a memory unit 806. For example, the memory unit 806 may have semiconductor random access memory (RAM) and semiconductor read only memory (ROM). The computer module 801 also includes an number of input/output (I/O) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 801, for example within the interface 808. The computer module 801 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet circuit card, a Bluetooth® wireless arrangement or an IEEE 802.11 wireless arrangement; however, numerous other types of interfaces may be practiced for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 800.

The components 805 to 813 of the computer module 801 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practised include IBM-PC's and compatibles, Sun Sparcstations, Apple Mac™ or like computer systems.

The methods of training an artificial neural network and performing classification described herein may be implemented using the computer system 800 wherein the processes of FIGS. 1-5 and 7, to be described, may be implemented as one or more software application programs 833 executable within the computer system 800. In particular, the steps of the method of FIGS. 1-5 and 7 are effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the methods of training an artificial neural network and performing classification and a second part and the corresponding code modules manage a user interface between the first part and the user.

The software 833 may be stored in a computer readable medium, including the storage devices described below, for example. The software 833 is typically stored in the HDD 810 or the memory 806. The software is loaded into the computer system 800 from a computer readable medium, and executed by the computer system 800. The software is loaded into the computer system 800 from the computer readable medium, and then executed by the computer system 800. A computer readable medium having such software or computer program recorded on the computer readable medium is a computer program product. The use of the computer program product in the computer system 800 preferably effects an advantageous apparatus for the described methods of training an artificial neural network and performing classification.

Thus, for example, the software 833 may be stored on an optically readable disk storage medium (e.g., CD-ROM) 825 that is read by the optical disk drive 812. A computer readable medium having such software or computer program recorded on it is a computer program product.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media. Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 801. Examples of transitory or non-tangible computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the storage device 809 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 801 to ensure proper functioning and typically checks the processor 805, the memory 834 (809, 806), and a basic input-output systems software (BIOS) module 835, also typically stored in the ROM 849, for correct operation. Once the POST program 850 has run successfully, the BIOS 835 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfil various high level functions, including processor management, memory management, device management, storage management, software application interface, and generic user interface.

The operating system 853 manages the memory 834 (809, 806) to ensure that each process or application running on the computer module 801 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used, As shown in FIG. 8B, the processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 805 waits for a subsequent input, to which the processor 805 reacts to by executing another set of instructions. Each input may be provided from one or more of a number of sources, including data generated by one or more of the input devices 802, 803, data received from an external source across one of the networks 820, 802, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The described arrangements use input variables 854, which are stored in the memory 834 in corresponding memory locations 855, 856, 857. The described arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

a fetch operation, which fetches or reads an instruction 831 from a memory location 828, 829, 830;

a decode operation in which the control unit 839 determines which instruction has been fetched; and an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 1, 2, 5, 7, 9 and 10 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The method of training an artificial neural network may alternatively be implemented in dedicated hardware such as one or more integrated circuits performing the functions or sub functions of training the artificial neural network or the artificial neural network itself. Such dedicated hardware may include graphic processors, digital signal processors, or one or more microprocessors and associated memories.

FIG. 1 shows a schematic flow diagram of a method 100 for performing classification. The method 100 is executable on the processor 805. The method 100 may be implemented by one or more submodules of the software application 833 stored in the memory 806. The method 100 comprises a training step 103 for training a classifier (for example an artificial neural network) and a classifying step 106 for performing classification.

Under execution of the processor 805, the method 100 starts with the training step 103. The training step 103 executes to receive and use a training dataset to define edge weights of an artificial neural network, also referred to hereafter as a network, resulting in a trained artificial neural network. The artificial neural network is typically stored in the memory 806. In other implementations, the artificial neural network is received by the computer module 801, for example via the network 820. A method 200 of training an artificial neural network, as executed at step 103, is described hereafter with reference to FIG. 2. An example diagram of an artificial neural network is shown by a network 600 in FIG. 6. Under execution of the processor 805, the method 100 progresses to the classifying step 106. At the classifying step 106, the trained network is used to perform classification of the classification data by applying a classification label to each instance of the classification data. A method 700 of performing classification of data, as executed at step 106, is described below in more detail with reference to FIG. 7.

Figure 6:
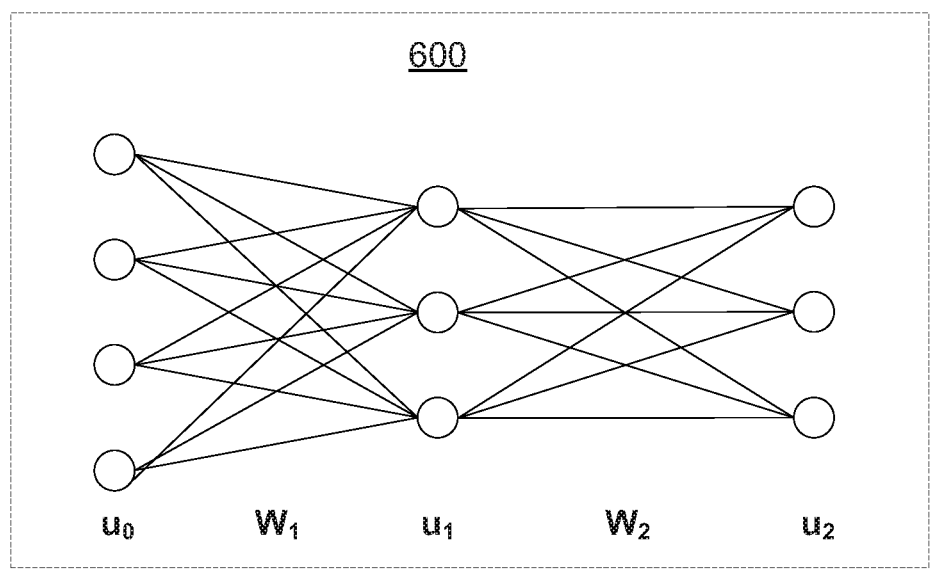
FIG. 6 is a block diagram showing an artificial neural network used in FIG. 1.

In the arrangements described, the network being trained is an artificial neural network. The artificial neural network uses a feed-forward process to activate the nodes of the network based on inputs, and the network is trained using backpropagation of a set of derivative values. The set of derivative values is determined from the combination of the derivatives of an error value determined by the difference between the activation value of the output nodes and the target for each training instance or training example, and the derivatives of one or more sparsity penalty values determined from the distribution of activation values of nodes in the network. The network 600 represents an artificial neural network consisting of sets of nodes and weighted connections arranged in layers, as shown in FIG. 6.

An example of the training data used is for classification of video, for example using a training dataset consisting of video of human actions, each with a corresponding label representing the action present in the video. The training dataset, and the data to be classified, may be stored in the memory 806 or may be received by the computer module 801 through inputs such as the camera 827, the disk storage medium 825, or from a remote device such as a server computer capable of communication with the computer system 801 via a network such as the network 822 or the network 820.

The described arrangements use a training example, comprising input values and a target. The network receives the input values and target, and modifications to the network are determined that are used to improve classification accuracy of the target by the network based on the received instances.

The described arrangements determine a sparsity penalty (cost function) value for each set of nodes of an artificial neural network. The sparsity penalty value is based on the activation values of the nodes in the set of nodes. Further, the sparsity penalty value is based on relative ranking of the nodes' activation values within the set of nodes. In the described arrangements, for each node in the set of nodes, the derivative of the sparsity penalty value with respect to each edge weight associated with that node is determined. The derivative of the sparsity penalty value is subsequently used to adjust or update the edge weight in a manner that increases the sparsity of the activation of nodes of the artificial neural network when presented with subsequent instances.

Use of the relative ranking to determine the sparsity penalty (objective function) value allows a relatively small number of nodes with the highest activation values to be affected to a lesser degree by sparsity penalties, while remaining nodes with relatively lower activation values will be affected to a greater degree. Use of the relative ranking is beneficial with regard to training the artificial neural network. Existing approaches to determining the sparsity penalty values, and the associated derivatives of sparsity penalty values with respect to edge weights, without regard to the relative ranking of activation values will, in the case of lack of sparsity, can adversely affect edge weights for nodes that have high activation values.

The described arrangements allow a small number of nodes in each set of nodes to respond strongly to the training data, while inhibiting other nodes in the set of nodes from responding strongly to the same training data, which is desirable in terms of sparsity.

FIGS. 2, 3, 4, 5, 6, 9 and 10 show an example implementation of training an artificial neural network. The implementation of FIGS. 2, 3, 4, 5, 6, 9 and 10 may for example be used for training an artificial neural network for classifying human actions present in video sequences. In some arrangements, the FIGS. 2, 3, 4, 5, 6, 9 and 10 relate to unsupervised learning by an artificial neural network.

Figure 2:
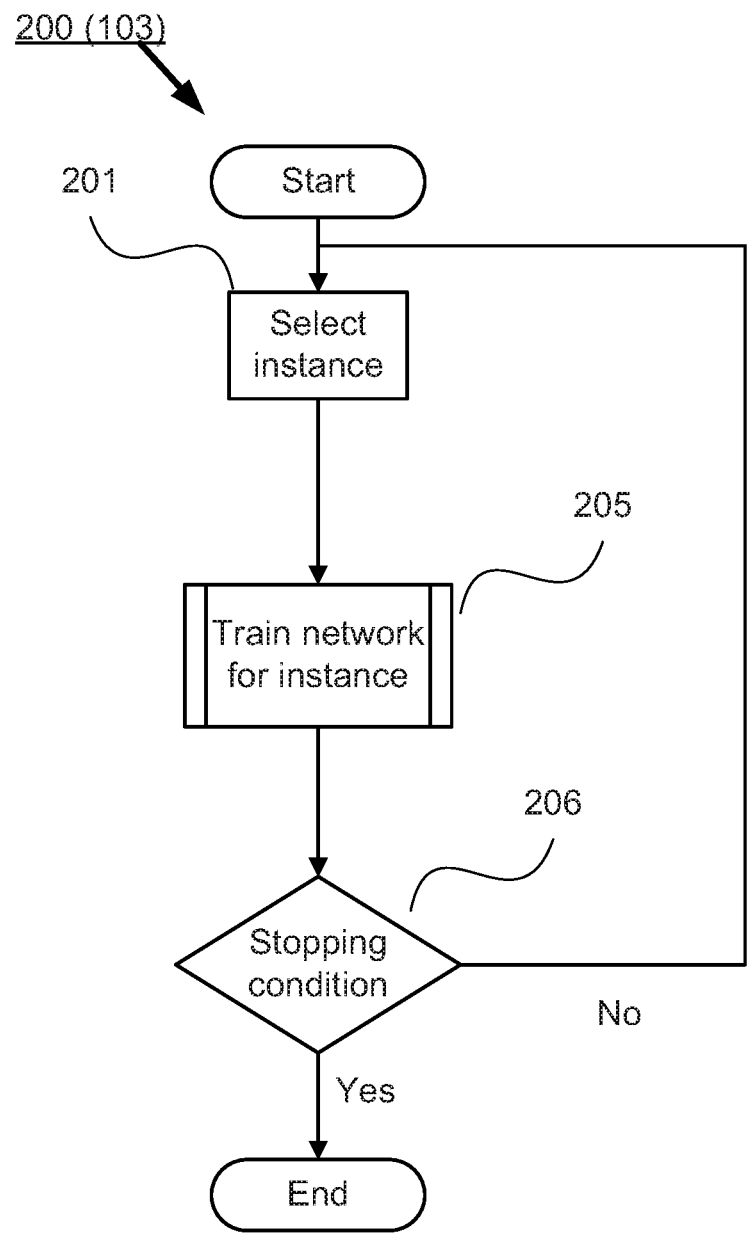
FIG. 2 is a schematic flow diagram showing a method of training the artificial neural network as used in the method of FIG. 1.

The method 200 of training an artificial neural network, as executed at step 103, is now described with reference to FIG. 2. The method 200 may be implemented by one or more submodules of the application 833 stored in the memory 806, and controlled by execution of the processor 805. The method 200 represents a method of training an artificial neural network.

The method 200 starts with execution of a select instance step 201. The select instance step 201 executes to receive a training dataset, as at step 103 of the method 100. The training dataset comprises a set of training examples. The step 201 executes to select one instance of the training examples of the training dataset. Each training example comprises one or more input values and a target, such that the target corresponds with the training input values.

The method 200 proceeds under execution of the processor 805 to a training step 205. Step 205 executes to access or receive and train the artificial neural network 600 for the selected instance using the training input and associated training target. Execution of the step 205 operates to train the network 600 such that the trained artificial neural network is operable to classify the training dataset more accurately than without such training. A method 500 of training the network, as executed at step 205, is described hereafter in relation to FIG. 5.

In an alternative implementation, training of the artificial neural network 600 implemented by execution of step 205 is applied based upon an average of activation values determined from several instances of the training dataset, referred to as a batch. For example, if a batch size of 100 is used, 100 training examples are received, selected and used to perform the training step 205. However, in such implementations, no modification or training is made to the artificial neural network 600. In such implementations, the activation values are aggregated and used to train the artificial neural network 600 after the step 205 has taken place for each instance in the batch. One example of aggregation of the activation values is averaging of the aggregation values.

Upon completion of the step 205, the method 200 progresses under execution of processor to step 206. At step 206, the method 200 executes to determine if a stopping condition is satisfied. If the stopping condition is not satisfied, the step 206 returns "No" and the method 200 executes to return to the step 201 to select another instance of the training dataset and the method 200 repeats as described hereinbefore. The method 200 continues to repeat execution of the steps 201 and 205 until the stopping condition is satisfied. Once the stopping condition is satisfied, the step 206 returns "Yes" and the method 200 ends.

In the example implementation described, the network 600 is a representation of an artificial neural network. The network topology of the artificial neural network 600 is a 2 layer network, consisting of a set of input layer nodes, a set of first layer edge weights, a set of first layer nodes, a set of second layer edge weights and a set of second layer nodes, also known as output nodes. The input layer nodes can be considered as initial layer nodes, and the first and second layer nodes can be considered as subsequent layer nodes. In an alternative implementation, the network 600 may he implemented as a convolutional neural network. In a convolutional neural network, edge weight values in each layer of the artificial neural network are convolved over the inputs to that layer. In a further alternative implementation, multiple layers are used in the network 600, forming a deep topology.

In determining if the stopping condition is met, the step 206 executes to determine if training of the network should be discontinued. For example, the stopping condition may be met after a fixed number of training examples, such as one million training examples have been selected and training conducted as per step 205.

In an alternative implementation an additional, separate training dataset may be used, known as a validation set. In implementations using a validation set, the step 206 executes to receive the validation set and classifies training examples of the validation set using the trained artificial neural network. The step 206 executes to determine an accuracy of the trained artificial neural network using the classification of the validation set, and determines whether to further train the artificial neural network. In a typical example, the stopping condition is satisfied when the determined accuracy of classifying instances of the validation set no longer decreases with further training.

The training dataset comprises a set of training data and a set of training targets, such that the training targets each correspond with an instance of the training data. An example training dataset is a set of 1000 training examples, each example consisting of a video sequence containing human actions, and a label representing the human action illustrated in the corresponding video. Each video represents a training input instance, and is composed of a series of still image frames, for example 500 frames of dimension 300×200. A corresponding training target is present for each training input instance, for example a label representing the human action present in the corresponding video, such as the action of running.

In an alternative implementation, the target is equal to the training input values for each instance of the training dataset, representing an implementation of an autoencoder that is trained to reconstruct the input data. The autoencoder is trained using the training dataset to be able to produce reconstruction of new instances of the input data with improved accuracy.

Figure 5:
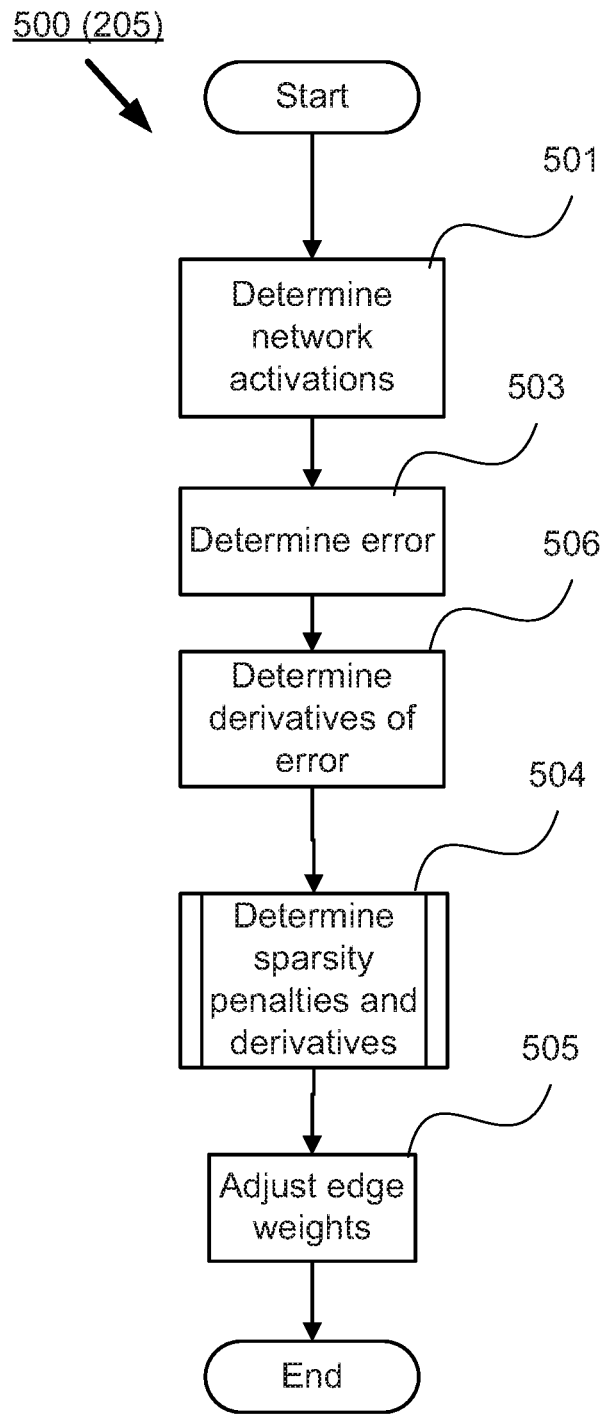
FIG. 5 is a schematic flow diagram showing a method of training the artificial neural network for an instance of a training dataset as used in the method of FIG. 2.

The method 500 of training the artificial neural network for one instance of the training dataset, as executed at step 205, is described in relation to FIG. 5. The method 500 may be implemented by one or more submodules of the application 833 stored in the memory 806, and controlled by execution of the processor 805.

The method 500 begins with a determining step 501 for determining network activations. The determining step 501 executes to receive training data to be applied to the artificial neural network, such as a selected training input instance. The step 501 executes to determine activation values for each node of the artificial neural network 600. For example, a training input representing a video clip is provided as input to the artificial neural network defined by the network 600, and the determining step 501 executes to determine activation values for each of the nodes of the artificial neural network 600 determined by propagation of the input values to the subsequent layer.

The method 500 executes to progress from the determining step 501 to a determining step 503. In execution of the step 503, the processor 805 executes to determine an error value for the network activations determined in step 501 compared to the training target for the selected instance of the training dataset. The determining step 503 executes to produce a value representing the error between the output produced by the artificial neural network 600 and the target. The error value between the network activation determined in step 501 and the training target input represents a relationship between the input data and the training target.

The method 500 executes under control of the processor 805 to progress from step 503 to a determining step 506. In the determining step 506, the processor 805 executes to determine a derivative of the error value determined in step 503 with respect to each edge weight of each node of the network 600.

The method 500 executes under control of the processor 805 to progress from step 506 to a determining step 504. In the determining step 504, the processor 805 executes to determine one or more sparsity penalty values for the network activations determined in step 501 for the selected instance of the training dataset. The determining step 504 executes to produce a sparsity penalty value for each sparsity set. The sparsity penalty value represents the divergence from the ideal sparsity of the sparsity set from the artificial neural network 600. In addition, the determining step 504 executes to produce a derivative of the sparsity penalty value corresponding to the corresponding sparsity set with respect to each edge weight in each node of the sparsity set, for each sparsity set. A method 900 of determining one or more sparsity penalty values, and the corresponding derivatives, as executed at step 504, is described hereafter in relation to FIG. 9.

The method 500 executes to progress from step 504 to an adjustment step 505. In the adjustment step 505, the processor 805 executes to update or modify the edge weights of the network 600 using the derivative of the error determined in the step 503 and the derivative of the sparsity penalty determined in step 504 with respect to the edge weights of the network 600. The edge weights are updated or adjusted using the derivative of the sparsity penalty values determined in the step 504 with respect to the edge weights of the network 600. In adjusting the edge weights of the network 600, the step 505 operates to train the network, using the activation values determined in step 501, to determine a relationship between the input data values and the target. Execution of the step 505 effectively relates to training the artificial neural network 600 by updating the nodes of the sparsity set using scaled activation values to train the artificial neural network.

At the completion of adjustment step 505, the method 500 ends.

Figure 7:
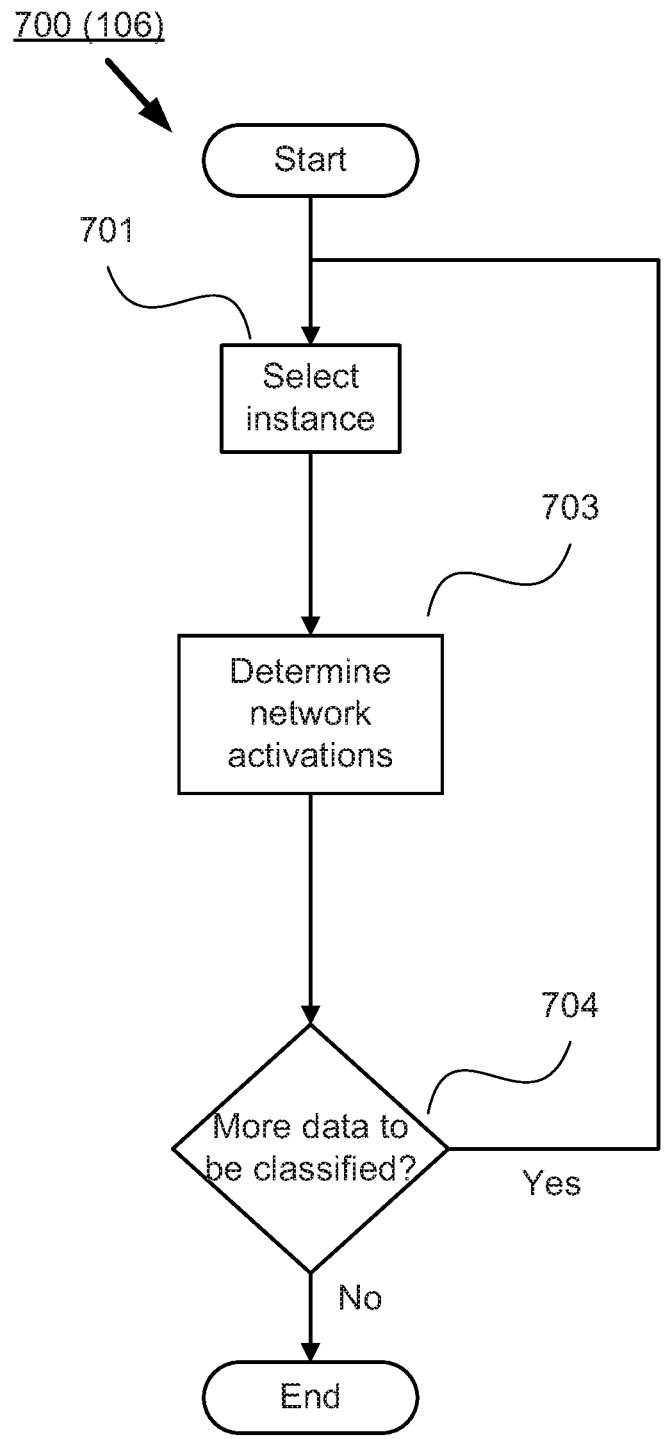
FIG. 7 is a schematic flow diagram showing a method of performing classification using an artificial neural network as used in the method of FIG. 1.

The method 700 of performing classification of data, as executed at step 106 of FIG. 1, is described in more detail with reference to FIG. 7. The method 700 may be implemented by one or more submodules of the application 833 stored in the memory 806, and controlled by execution of the processor 805.

The method 700 starts with execution of a selecting step 701. The step 701 executes to select an instance of classification input data from the set of data to be classified. The method 700 progresses to execute a determining step 703. The determining step 703 executes to determine network activations using the trained network and the input instance selected in step 701 to determine activation values of the nodes in the network 600. The step 703 executes using the same method for determining node activations as described in relation to the step 501 of FIG. 5. The classification label for the selected instance is determined using the activation values of the output nodes of the trained artificial neural network.

The method 700 progresses to execute a check step 704. The check step 704 executes to determine if more data is to be classified. If the check step 704 returns a Yes, that is more data is to be classified, the method 700 returns to repeat the step 701 and the step 703 as described above on a new instance of the classification data. If the step 704 determines that no more data is to be classified, the method 700 ends. The step 704 may find that no more data is to be classified if all instances of data in the input dataset have been classified, or if a pre-determined number of data instances of the input have been classified.

The method 900 of performing determination of sparsity penalty values, and corresponding derivatives of the sparsity penalty values with respect to the edge weights, as executed at step 504 of FIG. 5, is described in more detail with reference to FIG. 9. The method 900 may be implemented by one or more submodules of the application 833 stored in the memory 806, and controlled by execution of the processor 805.

The method 900 starts with execution of a selecting step 901. Execution of the step 901 selects a sparsity set to be processed. The sparsity set is typically a portion or subset of the artificial neural network, comprising a plurality of the nodes of the artificial neural network. Each sparsity set is associated with the determination of a corresponding sparsity penalty value, and the determination of associated derivatives of that sparsity penalty value with respect to the edge weights of the nodes in the sparsity set.

The method 900 progresses under execution of the processor 805 from the selection step 901 to a determining step 902. The determining step 902 executes to determine which nodes in the artificial neural network 600 are included in the sparsity set selected in step 901. Each sparsity set requires at least two nodes in order to determine a non-trivial sparsity penalty. A node from network 600 may be included in none, one, or multiple sparsity sets.

The method 900 progresses under control of the processor 805 from the determining step 902 to a determining step 903. The determining step 903 executes to determine a sparsity penalty value for the nodes determined to be in the sparsity set in step 902. In addition, execution of the determining step 903 determines derivative values for edge weights associated with the nodes determined to be in the sparsity set in step 902, with respect to the sparsity penalty value. A method 1000 of determining a sparsity penalty value, and the corresponding derivatives, as executed at step 903, is described hereafter in relation to FIG. 10.

The method 900 progresses under control of the processor 805 from the determining step 903 to a check step 904. The check step 904 executes to determine if more sparsity sets are to be processed. If the check step 904 returns a Yes, that is more sparsity sets are to be processed, the method 900 returns to repeat the step 901, the step 902, and the step 903 as described above on a new sparsity set. If the step 904 determines that no more sparsity sets are to be processed (step 904 returns No), the method 900 ends.

Figure 9:
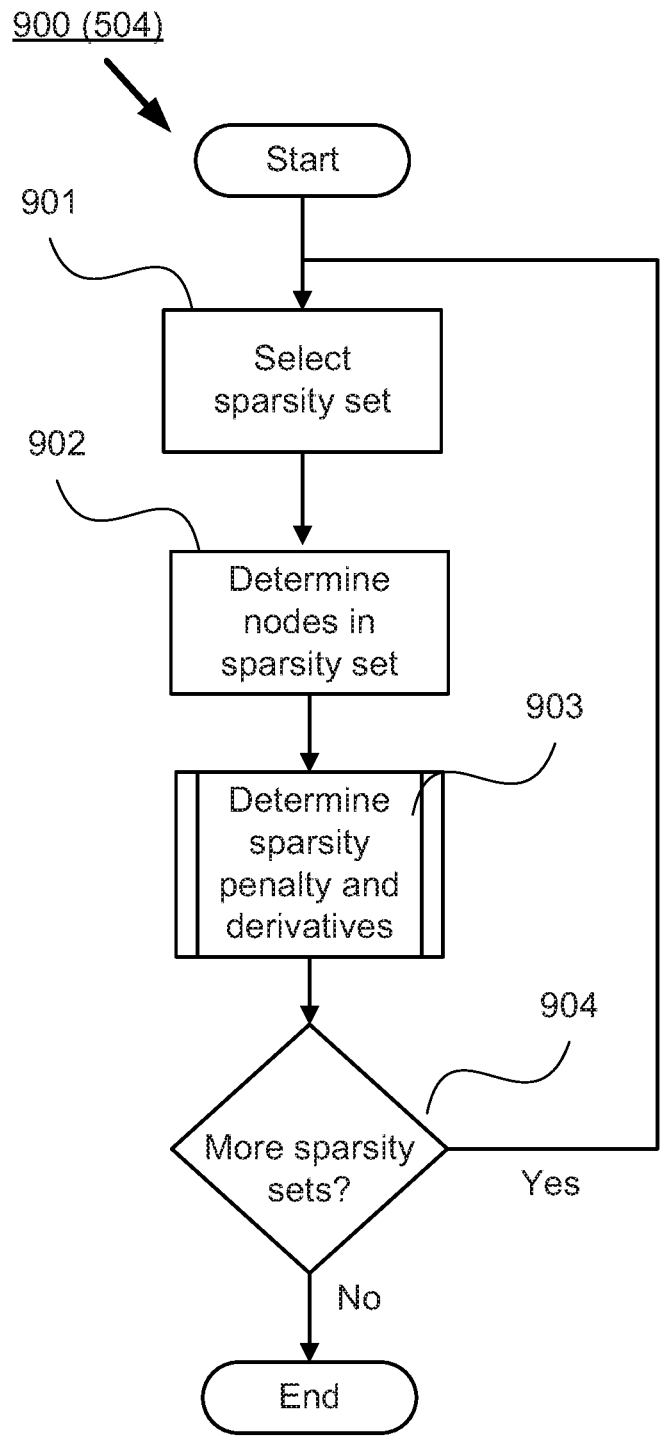
FIG. 9 is a schematic flow diagram showing a method of determining sparsity penalty values and associated derivatives for one or more sparsity sets, of an artificial neural network as used in the method of FIG. 1.

The method 1000 of determining a sparsity penalty value, and corresponding derivatives of the sparsity penalty value with respect to edge weights, as executed at step 903 of FIG. 9, is described in more detail with reference to FIG. 10. The method 1000 may be implemented by one or more submodules of the application 833 stored in the memory 806, and controlled by execution of the processor 805.

The method 1000 starts with execution of a determining step 1001. The step 1001 executes to determine the scaling factors associated with the sparsity set. The number of scaling factors is the same as the number of nodes in the sparsity set. An example of scaling factors is the series $\{(n-0.5)/n, (n+0.5)/n, (n+1.5)/n, \ldots, 0.5/n, 1.5/n\}$ where n is the number of nodes in the sparsity set. An alternative example of scaling factors is the series given by $\{0, 1/(n-1), 2/(n-1), 3/(n-1), \ldots, (n-2)/(n-1), 1\}$ where n is the number of nodes in the sparsity set.

In the examples of scaling factors above, the scaling factors vary monotonically to the rank of the associated node. In addition, in the examples of scaling factors given, each scaling factor is a different value to the other scaling factors in the series. Other implementations of scaling factors are possible, including scaling factors that do not vary monotonically, and scaling factors where some values are repeated.

The distribution of the values of scaling factors determines the contribution of each node to the sparsity penalty value, for the set of nodes in the sparsity set. Large values are assigned to nodes that should have significant contribution to the sparsity penalty value, and small values are assigned to nodes that should not have significant contribution to the sparsity penalty value. Identical values are assigned to nodes that should have identical contributions to the sparsity penalty value, and different values are assigned to nodes that should have different contributions to the sparsity penalty value.

For example, scaling factors for a sparsity set of five nodes are $\{0.1, 0.3, 0.5, 0.7, 0.9\}$, using the series $\{(n-0.5)/n, (n+0.5)/n, (n+1.5)/n, \ldots, 0.5/n, 1.5/n\}$ where n is 5. The example scaling factors are all different, which means that all five nodes will have different contributions to the sparsity penalty value. The largest scaling factor is 0.9, and is assigned to the node that should have the largest contribution to the sparsity penalty value based on activation values. The smallest scaling factor is 0.1, and is assigned to the node that should have the least contribution to the sparsity penalty value based on activation values.

The method 1000 progresses under control of the processor 805 from the determining step 1001 to a determining step 1003. The determining step 1003 executes to determine, for each node in the sparsity set, a rank of the node according to the activation value of the node determined at step 501. The determining step executes to compare to the activation values of all other nodes in the sparsity set. The rank of a node is typically determined such that the node with highest activation value of all nodes in the sparsity set is given a rank of 1, being the lowest rank, and the node with the lowest activation value of all nodes in the sparsity set is given a rank of n, being the highest rank, where n is the number of nodes in the sparsity set. For example, given nodes in a sparsity set with activation values $\{0.2, 0.4, 1.0, 0.3\}$, the corresponding rank of the nodes is given by $\{4, 2, 1, 3\}$.

In one implementation, the determining step 1003 is performed by sorting the activation values of nodes in the sparsity set in order of decreasing value, and then assigning the corresponding ranks in an incrementing sequence. For example, given the activation values $\{0.2, 0.4, 1.0, 0.3\}$ for nodes named $\{n1, n2, n3, n4\}$, the sorted activation values are $\{1.0(\text{from } n3), 0.4(\text{from } n2), 0.3(\text{from } n4), 0.2 (\text{from } n1)\}$, to which the ranks $\{1, 2, 3, 4\}$ are assigned, giving the following association of rank to nodes in the sparsity set: $\{1(\text{rank of } n3), 2(\text{rank of } n2), 3(\text{rank of } n4), 4(\text{rank of } n1)\}$.

In an alternative implementation, the activation values of the nodes are normalised, for example by dividing by the mean of the activation values over the nodes in the sparsity set. The rank is determined based upon the normalised activation values.

The method 1000 progresses under control of the processor 805 from the determining step 1003 to an assignment step 1004. The assignment step 1004 executes to assign one of the scaling factors determined in determining step 1001 to a node, based on the rank of the node as determined in the determining step 1003. The step 1004 is executed to associate a scaling factor with each node in the sparsity set. For example, if nodes are named $\{n1, n2, n3, n4\}$, and the scaling factors are $\{0, 1/3, 2/3, 1\}$ and the activation values of the nodes are $\{0.2, 0.4, 1.0, 0.3\}$, then the rank of the nodes is $\{4, 2, 1, 3\}$, and node n1 with activation value 0.2 and rank 4 is assigned or associated with the scaling factor 1, and node n2 with activation value 0.4 and rank 2 is assigned the scaling factor 1/3, and node n3 with activation value 1.0 and rank 1 is assigned the scaling factor 0, and node n4 with activation value 0.3 and rank 3 is assigned or associated with the scaling factor 2/3. In the example described herein, the node having the highest activation value is assigned lowest rank, and the node having the lowest activation value is assigned highest rank. The scaling factor for the node with lowest rank is a lowest scaling factor, and the scaling factor for the node with highest rank is a highest scaling factor. Nodes with activation values between the highest activation value and the lowest activation value are assigned scaling factors between the highest scaling factor and the lowest scaling factor. Other implementations may rank the nodes in an opposite order.

The method 1000 progresses under control of the processor 805 from assignment step 1004 to a determining step 1005. The determining step 1005 executes to determine a scaled activation value for each node in the sparsity set. The scaled activation value is the product of the node's activation value and the node's assigned scaling factor, based on the rank of the node. For example, if the nodes have activation values {0.2, 0.4, 1.0, 0.3} and have assigned scaling factors {1, 1/3, 0, 2/3}, based on the rank of the nodes being {4, 2, 1, 3}, the nodes have scaled activation values of {0.2, 0.13, 0, 0.2}. The step 1005 effectively operates to scale the activation values for each of the nodes in the sparsity set, each activation value scaled by the scaling factor associated with a corresponding one of the nodes, the scaling factor being determined based on a rank of the corresponding node at step 1004.

The method 1000 progresses under control of the processor 805 from the determining step 1005 to a determining step 1007. The determining step 1007 executes to determine the sparsity penalty value of the sparsity set. The sparsity penalty value is the sum of the scaled activation values of the nodes in the sparsity set, as determined in determining step 1005 of method 1000. For example, if the nodes have scaled activation values of {0.2, 0.13, 0, 0.2}, the sparsity penalty value is 0.53.

The method 1000 progresses under control of the processor 805 from the determining step 1007 to a determining step 1008. The determining step 1008 executes to determine the derivative of the sparsity penalty value determined in determining step 1007 with respect to each edge weight associated with a node in the sparsity set. The derivative is used to adjust the edge weight of the node, in order to improve the sparsity of the responses of the nodes in the sparsity set.

In an alternative arrangement, a sparsity score is derived from the sparsity penalty value at step 1008. The sparsity score is scaled to determine a sparsity score in a predetermined range. For example, the equation "score=1−(2×penalty)" is used to determine a score in the range 0 to 1.

At the completion of determining step 1008, method 1000 ends.

The use of a sparsity penalty value as determined in method 1000 addresses problems with training artificial neural networks such as overfitting, and the large amount of processing time in order to achieve a required accuracy. In particular, the use of scaling factors applied to the activation values of a set of nodes in a sparsity set, based on the relative rank of those activation values, improves the training of artificial neural networks by adjusting the edge weights. The edge weights are adjusted in a way that allows a small number anodes to have large activation values, and the remaining nodes to have small activation values, and thus the artificial neural network converges to a sparsely responding network.

Figure 4:
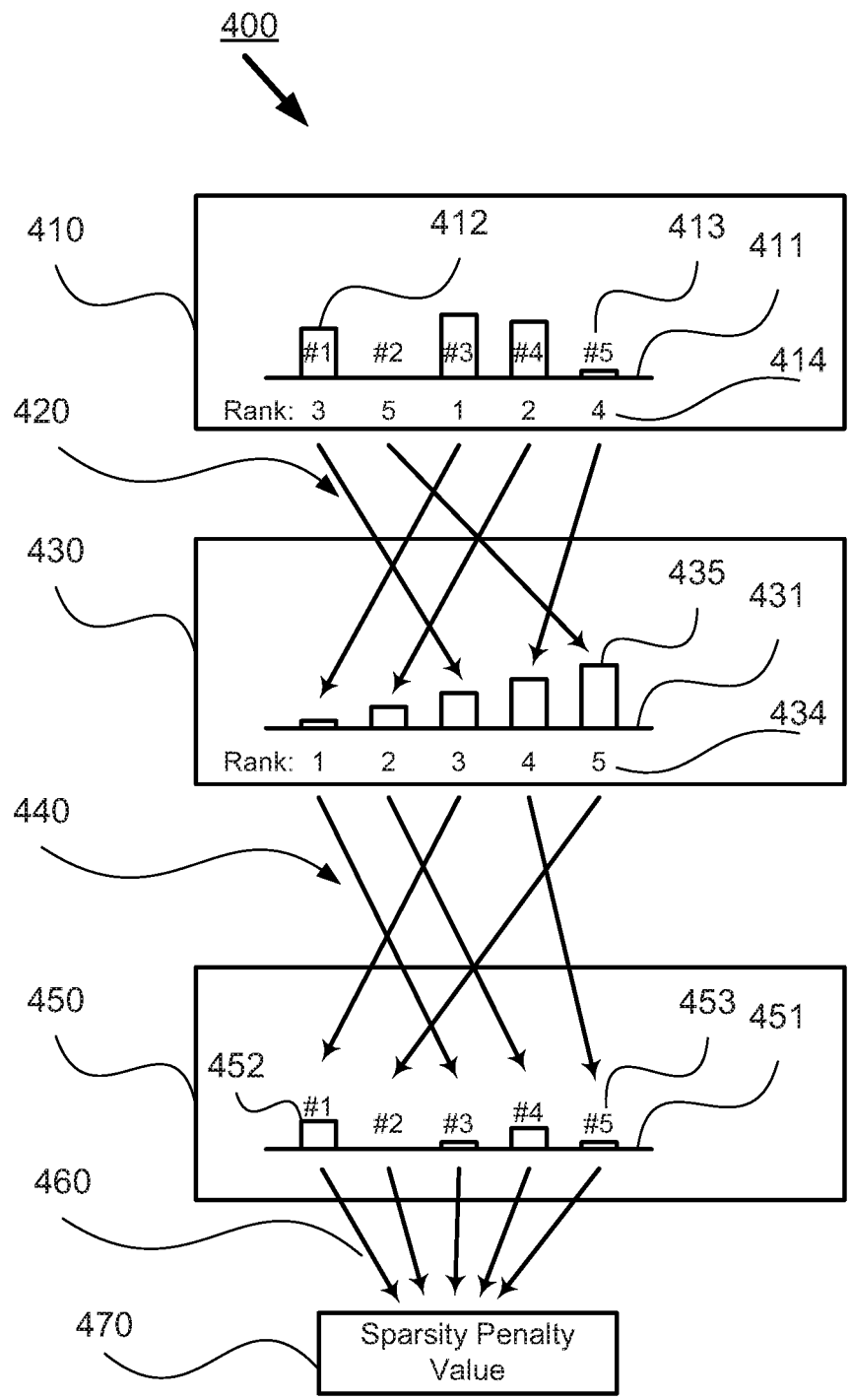
FIG. 4 is a graphical representation of an example of determining a sparsity penalty value from the activation values of a set of nodes in a sparsity set, using a method shown in FIG. 10.
Figure 10:
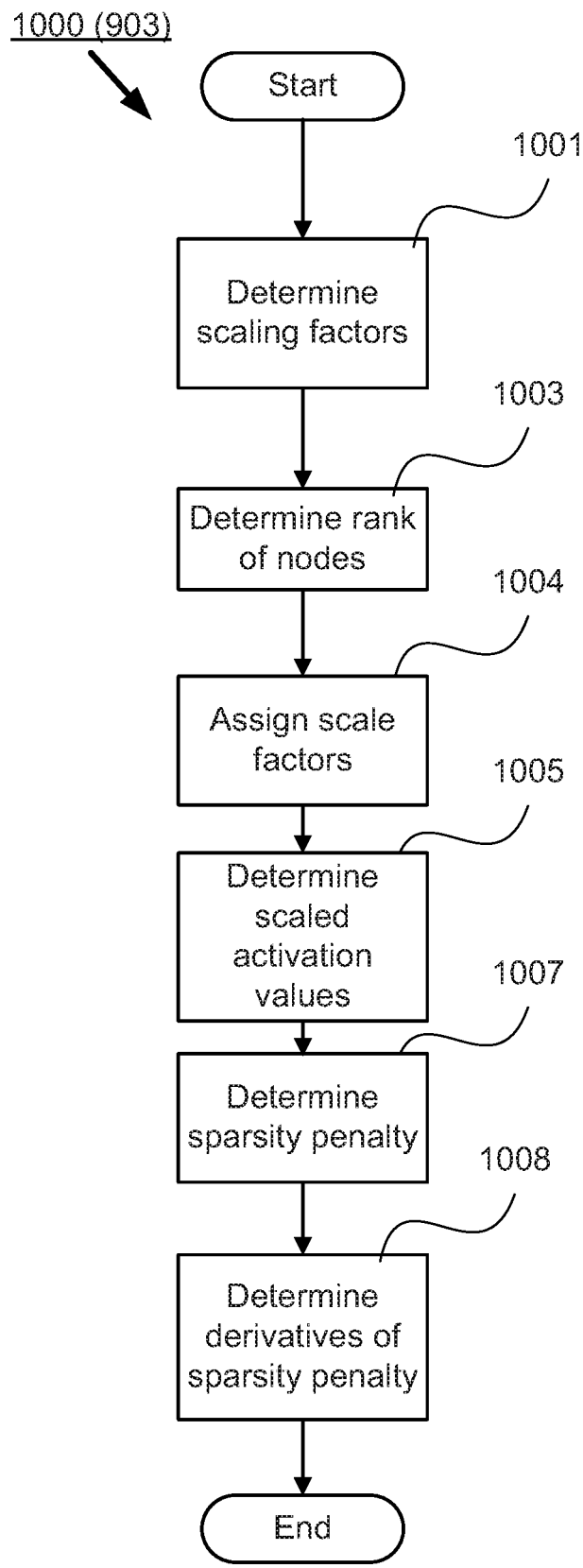
FIG. 10 is a schematic flow diagram showing a method of determining a sparsity penalty value and associated derivatives for a sparsity set, of an artificial neural network as used in the method of FIG. 1.

Implementation of the method 1000 of FIG. 10 is now be illustrated by reference to an example 400 of FIG. 4. In FIG. 4, the activation values of five nodes in the sparsity set of an artificial neural network in response to a training data instance are graphically represented in an area 410. In the area 410, labels such as a label 413 indicate an identifying number for each node in the sparsity set, where "#1" indicates a first node, "#2" indicates a second node, "#3" indicates a third node, "#4" indicates the fourth node, and "#5" indicates a fifth node. In the area 410, the activation value of each node is indicated by the height of a rectangle such as a rectangle 412 above a baseline 411. Nodes with higher activation values are depicted by rectangles with greater height above the baseline 411. From the area 410, it can be seen that node #3 has the largest activation value, followed by node #4, then by node #1, then by node #5, and finally node #2 has the smallest activation value.

In the example 400 of FIG. 4, scale factors are graphically represented in an area 430. In the area 430, the value of each scale factor is indicated by the height of a rectangle such as a rectangle 435 above a baseline 431. Larger scale factors are depicted by rectangles with greater height above the baseline 431.

In FIG. 4, the rank of each node in the sparsity set is determined, according to the activation values of the nodes in the sparsity set. The rank 414 of each node in the area 410 is indicated below the corresponding activation value rectangle (such as the rectangle 412) for that node. In FIG. 4, node #4 has the largest activation value, and has rank 1. Node #3 has the next largest activation value, and has rank 2. Node #1 has the next largest activation value, and has rank 3. Node #5 has the next largest activation value, and has rank 4. Node #2 has the smallest activation value, and has rank 5.

In FIG. 4, each scale factor is associated with a rank, which is indicated by labels such as a label 434 in the area 430. In the example 400, the scale factors are monotonically decreasing, such that the smallest scale factor is associated with rank 1, and the largest scale factor is associated with rank 5. However, other arrangements are possible, including scale factors that increase or decrease with respect to rank, and/or use the same value for more than one rank.

In FIG. 4, the each node in the sparsity set is assigned a scale factor, according to the rank of the node in the sparsity set. In the example 400, node #3 has rank 1, and is assigned the scale factor that is associated with rank 1. Node #4 has rank 2, and is assigned the scale factor that is associated with rank 2. Node #1 has rank 3, and is assigned the scale factor that is associated with rank 3. Node #5 has rank 4, and is assigned the scale factor that is associated with rank 4. Node #2 has rank 5, and is assigned the scale factor that is associated with rank 5. The assignments between the nodes of the sparsity set and the scale factors are indicated by the arrows 420.

In FIG. 4, the activation of each node in the sparsity set is scaled by the scaling factor assigned to that node, determining a scaled activation value for that node. The determination of the scaled activation values is indicated by arrows 440. In the example 400, the activation value of node #3, having a determined rank of 1, is multiplied by the scale factor associated with rank 1, in order to determine a scaled activation value for node #3. The activation value of node #4, having a determined rank of 2, is multiplied by the scale factor associated with rank 2, in order to determine a scaled activation value for node #4. The activation value of node #1, having a determined rank of 3, is multiplied by the scale factor associated with rank 3, in order to determine a scaled activation value for node #1. The activation value of node #5, having a determined rank of 4, is multiplied by the scale factor associated with rank 4, in order to determine a scaled activation value for node #5. The activation value of node #2, having a determined rank of 5, is multiplied by the scale factor associated with rank 5, in order to determine a scaled activation value for node #2.

In FIG. 4, the scaled activation values of the nodes in the sparsity set are graphically represented in an area 450. In the area 450, labels (for example a label 453) indicate an identifying number for each node in the sparsity set, where "#1" indicates the first node, "#2" indicates the second node, "#3" indicates the third node, "#4" indicates the fourth node, and "#5" indicates the fifth node. In the area 450, the scaled activation value of each node is indicated by a height of a rectangle, for example a rectangle 452, above a baseline 451. Nodes with higher scaled activation values are depicted by rectangles with greater height above the baseline 451. The area 450 shows that node #1 has the largest scaled activation value, followed by node #4, then by node #3, then by node #5. Finally node #2 has the smallest scaled activation value.

In FIG. 4, a sparsity penalty value 470 is determined by the summation of the scaled activation values depicted in the area 450. The summation is depicted by the arrows 460 and relates to step 2007 of the method 1000.

As shown in FIG. 4, the contribution to the sparsity penalty value is dependent on the rank of each node in the sparsity set, and based on the activation values of the nodes. In the example of FIG. 4, node #3 has the largest activation value, but has a small contribution to the sparsity penalty value. In contrast, node #4 and node #1, which have large activation values, but not as large as node #3, have large contributions to the sparsity penalty value. The derivative of the sparsity penalty value with respect to each edge weight associated with a node in the sparsity set is used to adjust the edge weight (step 505). FIG. 4 shows that the edge weights for node #4 and node #1 are adjusted to a greater degree than the edge weights for node #3, as a result of the sparsity penalty value. The adjustment based on the sparsity penalty value achieves a desirable outcome of continuing to allow a small number of nodes (namely, node #3) to respond strongly to the training data instance, while attenuating the response of other nodes (namely, node #4 and node #1). Illustration of the method 1000 of FIG. 10 by reference to the example in FIG. 4 is thereby complete.

FIG. 6 shows an example of the artificial neural network 600. In FIG. 6, the nodes of an input layer are represented by $u_0$, and weighted connections of the first or input layer $u_0$ are represented by a tensor $W_1$. Nodes of a second layer are represented by $u_1$ in the network 600, and weighted connections of the second layer $u_1$ are represented by $W_2$. The output nodes of the network 600 are shown as $u_2$.

Referring to the network 600 described in relation to FIG. 6, an example of training using an instance of a training dataset is now described. The network 600 has 2 layers: an input layer with 4 nodes, a first layer with 3 nodes, and a second layer with 3 nodes. The second layer nodes, also referred to as output nodes, are of the same dimension as the training target of the instance of the training dataset. Weighted connections exist between the nodes in each layer of the network, with 12 edge weights between the input and first layer nodes, and 9 edge weights between the first and second layer nodes.

The example network has edge weight tensor $W_1$ with edge weights [0.1, 0.7, 0.1, 0.2] for the first node in $u_1$, edge weights [−0.3, −0.1, −0.2, 0.9] for the second node in $u_1$, and edge weights [−0.4, 0.9, −0.4, 0.3] for the third node in $u_1$. The example network has edge weight tensor $W_2$ with edge weights [−0.09, −0.03, 0.01] for the first node in $u_2$, edge weights [0.07, 0.07, −0.05] for the second node in $u_2$, and edge weights [0.07, 0.02, 0.05] for the third node in $u_2$. For a given training input instance, for example with values [255, 0, 30, 128], the input nodes $u_0$, are set to the values of the training data instance. Using the network 600, in which the edge weights of the first layer are represented using the tensor the activation values of the first layer nodes $u_1$ are determined as $u_1=\max(0, u_0 W_1)$, using a rectified linear function as the activation function. Execution of the step 501 in method 500 produces the activation vector $u_1$, as follows:

$$u_0 W_1 = [54.1, 32.7, -75.6]$$

$$u_1 = \max(0, u_0 W_1) = [54.1, 32.7, 0.0]$$

The activation value for the output nodes $u_2$ are determined using the example edge weight tensor $W_2$ as follows:

$$u_1 W_2 = [-5.85, 6.076, 4.441]$$

$$u_2 = \max(0, u_1 W_2) = [0.0, 6.076, 4.441]$$

Execution of the step 503 in the method 500 determines the error value by comparison of the output node activations $u_2$ with the training target, represented with the symbol t. The training target is provided as part of the training dataset. In the example of FIG. 6 an error value e is determined using a squared error $e = \|t - u_2\|^2$. The error value e is determined using a target value of t=[0, 5, 5], e=1.47.

For each node of the artificial neural network 600, the derivative de/dW is determined. In step 506 of the method 500 for each edge weight W, where e is the error value. In the example relating to FIG. 6, the derivative values are [18.46, 0, 2.17, 9.26], [32.71, 0, 3.85, 16.42], [0, 0, 0, 0] for edge weight tensor $W_1$ and [0, 0, 0], [116.42, 70.37, 0], [−60.48, −36.56, 0] for edge weight tensor $W_2$.

In order to determine the sparsity penalty, one or more sparsity sets are constricted. Each sparsity set comprises at least two nodes of the artificial neural network 600. In the example of FIG. 6 one sparsity set is used, as determined in execution of the step 902 of FIG. 9. In the example of FIG. 6 the sparsity set is constructed from the nodes $u_1$.

For each sparsity set, a set of scale factors is determined, based on the number of nodes in the set, using the method 1000. In the example of FIG. 6, the number of nodes in the sparsity set is 3. In the example described in relation to FIG. 6 a set of scale factors {0, 0.5, 1} is used.

For each sparsity set, the activation values of the nodes are sorted, in order to assign a rank to each node in the sparsity set, as described in relation to step 1003. Each activation value is then assigned one of the scale factors corresponding to the sparsity set, based on the rank of the node in the sparsity set, as described in relation to step 1004. For each node, the scaled activation value is determined by multiplying the activation value of the node with the assigned scale factor, as described in relation to step 1005. The sparsity penalty for each sparsity set is determined by summing the scaled activation values, as described in relation to step 1008. In the example described herein the sparsity penalty $p_1$ corresponds to the sparsity set, as follows: $p_1 = 54.1*0.0 + 32.7*0.5 + 0.0*1.0 = 16.35$ For each sparsity set, the derivative dp/dW is determined for each edge weight W for each node in the sparsity set as described in relation to step 1008, where p is the sparsity penalty determined for that sparsity set. In the example described herein in relation to FIG. 6, the derivative values are [0, 0, 0, 0], [127.50, 0, 15.00, 64.00], [0, 0, 0, 0] for edge weight tensor $W_1$.

In the implementation described, adjustment of edge weights by the step 505 is executed by modifying each edge weight value in the edge weight tensors $W_1$ and $W_2$, according to the derivatives de/dW, and dp/dW for each sparsity set of which the corresponding node is a member. For example, the step 505 executes by setting $W_1 = W_1 - v_e \, de/dW_1 - v_{p1} \, dp_1/dW_1$, and by setting $W_2 = W_2 - v_e \, de/dW_2$, where $v_e$ and $v_{p1}$ are constants defining a rate of learning of the artificial neural network 600, for example $v_e = v_{p1} = 0.01$. The constants defining the rate of learning, $v_e$ and $v_{p1}$, are typically determined experimentally. Modifications to the values of the edge weight tensors $W_1$ and $W_2$ are applied to the network 600, performing training of the network 600.

In another implementation, the previously described example is augmented by the addition of a second sparsity set. The second sparsity set is constructed from the nodes $u_2$. The number of nodes in the second sparsity set is 3. The example using a second sparsity set uses a set of scale factors {0, 0.5, 1} for the second sparsity set. The sparsity penalty $p_2$ corresponds to the second sparsity set, as follows:

$$p_2 = 6.076*0.0 + 4.441*0.5 + 0.0*1.0 = 2.2205$$

The derivative $dp_2/dW$ is determined for each edge weight W for each node in the second sparsity set. In the example described herein, the derivative values [0, 0, 0], [0, 0, 0], [27.05, 16.35, 0] for edge weight tensor $W_2$.

The adjustment of edge weights by the step 505 is executed by modifying each edge weight value in the edge weight tensors $W_1$ and $W_2$, according to the derivatives de/dW, and dp/dW for each sparsity set of which the corresponding node is a member. For example, the step 505 executes by setting $W_1=W_1-v_e\,de/dW_1-v_{p1}$, and by setting $W_2=W_2-v_e\,de/dW_2-v_{p2}\,dp_2/dW_2$, where $v_e$, $v_{p1}$ and $v_{p2}$ are constants defining the rate of learning, for example $v_e=v_{p1}=v_{p2}=0.01$. The constants defining the rate of learning, $v_e$, $v_{p1}$ and $v_{p2}$, are typically determined experimentally. Modifications to the values of the edge weight tensors $W_1$ and $W_2$ are applied to the network 600, performing training of the network 600.

The described methods of training an artificial neural network provide a benefit of a reduction in overfitting, as evidenced by a corresponding decrease in error values when the artificial neural network is tested. An experiment on a specific data set, where the artificial neural network was trained as an autoencoder, shows an average error value of 0.14 after 2 million instances of training data. The average error value shown is an improvement over previously known methods which typically show an error value of 0.30 after 2 million instances of training data.

In addition, the described methods of training an artificial neural network provide a benefit of a reduction in the number of training instances required to train the network to attain a sufficiently low error value. In the experiment as described above, if the artificial neural network was trained as an autoencoder, the average error value of 0.30 was attained after only 400 thousand instances of training data. The attained average error value is an improvement over previously known methods, which typically show an error value of 0.30 after 2 million instances of training data.

An example use of the described methods of training an artificial neural network is for an application for detecting human action in video. Using the example of 500 video frames described above, an artificial neutral network is trained on the computer module 801 using the methods described to identify human action in the video sequence. The trained artificial neural network can be stored on the computer module 801, or on a removable storage device such as the medium 825, or on another computing device. The stored trained artificial neural network can be used to build an application for detecting human action in video operable on the computer module 801 or another computing device. Video frames can be provided to the trained artificial neural network to identify desired actions. For example, a security application may be configured to identify running action.

In a further implementation, the arrangements described are used for classification of objects in images, and for object discrimination, where the boundaries of objects present in an image are determined.

A further implementation is use of the described arrangements to train an artificial neural network for speech recognition and classification of audio and other temporal data.

The arrangements described are applicable to the computer and data processing industries and particularly for the image and audio processing industries.

The arrangements described are also applicable to incremental learning applications. In incremental learning applications, the artificial neural network is trained incrementally, using additional training data. In incremental learning applications, the determination of sparsity penalty values is used to update the edge weights in the artificial neural network. The edge weights are updated in order to improve performance of the artificial neural network, for example in response to changing conditions or the availability of additional training data.

In using the rank of the activation values of the nodes to determine the scaling factor, the methods described improve the sparsity response of an artificial neural network such as the network 600 such that the number of nodes with strong responses can be improved. The use of scaling factors applied to the activation values of a set of nodes in a sparsity set, based on the relative rank of those activation values, improves adjustment of the edge weights during training. The accuracy of the artificial neural network can be improved using a lesser number of training samples than previously known solutions, saving time and processing requirements. Further, overfitting can be reduced. In adjusting edge weights based on rank of activation values using the methods of FIGS. 5, 9, and 10, the arrangements described are generally suitable for training an artificial neural network, and particularly suitable for unsupervised learning (training without labelled data).

The foregoing describes only some embodiments of the present invention, and modifications and/or changes can be made thereto without departing from the scope and spirit of the invention, the embodiments being illustrative and not restrictive.

The invention claimed is:

1. A method of training an artificial neural network, the method comprising:
   determining activation values for nodes of the artificial neural network, the activation values being determined by applying training data to the artificial neural network;
   scaling the determined activation values for each of a plurality of the nodes in a portion of the artificial neural network by assigning scaling factors in ascending order to the determined activation values in descending order respectively and multiplying each of the determined activation values with an associated one of the scaling factors, each of the scaled activation values being determined using the scaling factor associated with a corresponding one of the nodes, and each of the scaling factors being determined based on a rank of the corresponding node; and
   updating weights associated with each of the nodes in the portion of the artificial neural network using the determined scaled activation values to train the neural network.

2. The method according to claim 1, wherein the rank of each of the plurality of the nodes is determined according to the activation value of the node.

3. The method according to claim 1, wherein the plurality of the nodes are ranked from a highest activation value to a lowest activation value, the node having the highest activation value being assigned lowest rank, and the node having the lowest activation value being assigned highest rank.

4. The method according to claim 1, wherein the plurality of the nodes are ranked from a highest activation value to a lowest activation value, the node having the highest activation value being assigned lowest rank, and the node having the lowest activation value being assigned highest rank, wherein the scaling factor for the node with lowest rank is a lowest scaling factor, and the scaling factor for the node with highest rank is a highest scaling factor.

5. The method according to claim 1, wherein the plurality of the nodes are ranked from a highest activation value to a lowest activation value, the node having the highest activation value being assigned lowest rank, and the node having the lowest activation value being assigned highest rank, wherein nodes with activation values between the highest activation value and the lowest activation value have scaling factors between the highest scaling factor and the lowest scaling factor.

6. The method according to claim 1, wherein the scaling factor varies monotonically according to the rank of the associated node.

7. The method according to claim 1, wherein the scaling factor associated with one of the nodes has a different value to the scaling factors associated with other nodes in the nodes.

8. The method according to claim 1, wherein the scaling factor associated with one of the plurality of the nodes is repeated in at least one scaling factor associated with another node in the plurality of the nodes.

9. The method according to claim 1, wherein the training data is additional training data and training the artificial neural network relates to incremental learning by the artificial neural network.

10. The method according to claim 1, further comprising determining a sparsity penalty value based on relative ranking of the activation values of the plurality of the nodes.

11. The method according to claim 1, further comprising determining a sparsity penalty value using the scaled activation values, and updating the weights relates to the sparsity penalty value.

12. The method according to claim 1, further comprising determining a sparsity penalty value using the scaled activation values, determining a derivative of the sparsity penalty value and updating the weights based on the determined derivative.

13. The method according to claims 1, further comprising sorting the activation values of the plurality of the nodes in the portion of the artificial neural network in order of decreasing value, and determining the rank of each node in an incrementing sequence.

14. The method according to claim 1, further comprising normalising the determined activation values of the plurality of the nodes using a mean of the determined activation values of the nodes, and determining the rank of the nodes using the normalised activation values.

15. A non-transitory computer readable medium having a computer program stored thereon for training an artificial neural network, said program comprising:
  code for determining activation values fornodes of the artificial neural network, the activation values being determined by applying training data to the artificial neural network;
  code for scaling the determined activation values for each of a plurality of the nodes in a portion of the artificial neural network by assigning scaling factors in ascending order to the determined activation values in descending order respectively and multiplying each of the determined activation values with an associated one of the scaling factors, each of the scaled activation values being determined using the scaling factor associated with a corresponding one of the nodes, and each of the scaling factors being determined based on a rank of the corresponding node; and
  code for updating weights associated with each of the nodes in the portion of the artificial neural network using the determined scaled activation values to train the neural network.

16. An apparatus for training an artificial neural network, the apparatus comprising:
  one or more processors; and
  a memory for storing programs to be executed by the one or more processors,
  wherein the programs stored in the memory cause, when executed by the one or more processors, the one or more processors to operate to:
  determine activation values for nodes of the artificial neural network, the activation values being determined by applying training data to the artificial neural network;
  scale the determined activation values for each of a plurality of the nodes in a portion of the artificial neural network by assigning scaling factors in ascending order to the determined activation values in descending order respectively and multiplying each of the determined activation values with an associated one of the scaling factors, each of the scaled activation values being determined using the scaling factor associated with a corresponding one of the nodes, and each of the scaling factors being determined based on a rank of the corresponding node; and
  update weights associated with each of the nodes in the portion of the artificial neural network using the determined scaled activation values to train the neural network.

17. A system for training an artificial neural network, the system comprising:
  a memory for storing data and a computer program;
  a processor coupled to the memory for executing said computer program, said computer program comprising instructions for:
    determining activation values for nodes of the artificial neural network, the activation values being determined by applying training data to the artificial neural network;
    scaling the determined activation values for each of a plurality of the nodes in a portion of the artificial neural network by assigning scaling factors in ascending order to the determined activation values in descending order respectively and multiplying each of the determined activation values with an associated one of the scaling factors, each of the scaled activation values being determined using the scaling factor associated with a corresponding one of the nodes, and each of the scaling factors being determined based on a rank of the corresponding node; and
    updating weights associated with each of the nodes in the portion of the artificial neural network using the determined scaled activation values to train the neural network.

* * * * *